United States Patent
Patil et al.

(10) Patent No.: US 12,033,298 B2
(45) Date of Patent: Jul. 9, 2024

(54) METHOD FOR MAINTAINING 3D ORIENTATION OF ROUTE SEGMENTS AND COMPONENTS IN ROUTE HARNESS FLATTENING

(71) Applicant: Dassault Systemes SolidWorks Corporation, Waltham, MA (US)

(72) Inventors: Satyajeet Patil, Maharashtra (IN); Nitin Shirkey, Pune (IN); Sameer Bondre, Pune (IN)

(73) Assignee: Dassault Systemes SolidWorks Corporation, Waltham, MA (US)

( * ) Notice: Subject to any disclaimer, the term of this patent is extended or adjusted under 35 U.S.C. 154(b) by 86 days.

(21) Appl. No.: 17/529,960

(22) Filed: Nov. 18, 2021

(65) Prior Publication Data
US 2023/0153940 A1    May 18, 2023

(51) Int. Cl.
| | |
|---|---|
| *G06F 30/00* | (2020.01) |
| *B60R 16/02* | (2006.01) |
| *G06F 30/18* | (2020.01) |
| *G06T 3/06* | (2024.01) |
| *G06F 113/16* | (2020.01) |

(52) U.S. Cl.
CPC ............ *G06T 3/06* (2024.01); *B60R 16/0207* (2013.01); *G06F 30/18* (2020.01); *G06F 2113/16* (2020.01)

(58) Field of Classification Search
None
See application file for complete search history.

(56) References Cited

U.S. PATENT DOCUMENTS

| | | | |
|---|---|---|---|
| 7,558,705 B1 | 7/2009 | Hughes | |
| 2002/0111778 A1 | 8/2002 | Barrow | |
| 2003/0050723 A1* | 3/2003 | Ozaki | G06F 30/18 700/117 |
| 2009/0222121 A1 | 9/2009 | Flores | |
| 2010/0070243 A1* | 3/2010 | Yvon | G06F 30/18 703/1 |
| 2017/0243361 A1* | 8/2017 | Schaffert | G06T 11/005 |
| 2023/0134125 A1* | 5/2023 | Baltaxe | G06V 10/82 701/23 |

FOREIGN PATENT DOCUMENTS

EP    0967122    12/1999

OTHER PUBLICATIONS

Extended European Search Report for EP 22208406.3 dated Apr. 13, 2023.
Dassault Systemes; "Generating Separate Routing Assemblies of Cables" Sep. 2021.

* cited by examiner

*Primary Examiner* — Joni Hsu
(74) *Attorney, Agent, or Firm* — Sheehan Phinney Bass & Green PA

(57) ABSTRACT

A 3D modeled CAD object is flattened to a two dimensional 2D representation while maintaining a user selected wiring component represented in 3D. A user selected 3D component has a connector and a route segment with at least one stored sketch segment. A 3D and 2D tangent are calculated at a junction point of the route segment. A translation and rotation transformation is calculated to align the 2D and 3D tangents at the junction point. A calculated transformation matrix based on the translation and rotation transformation is used to display a flattened unconnected route segment aligned with the user selected 3D component.

7 Claims, 9 Drawing Sheets

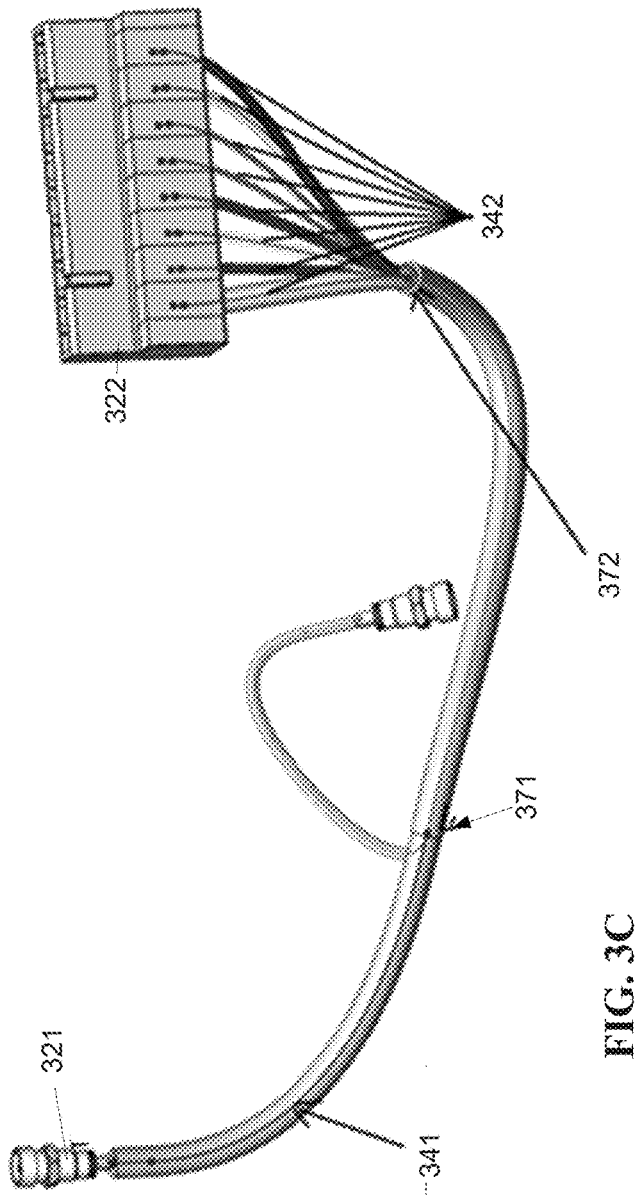
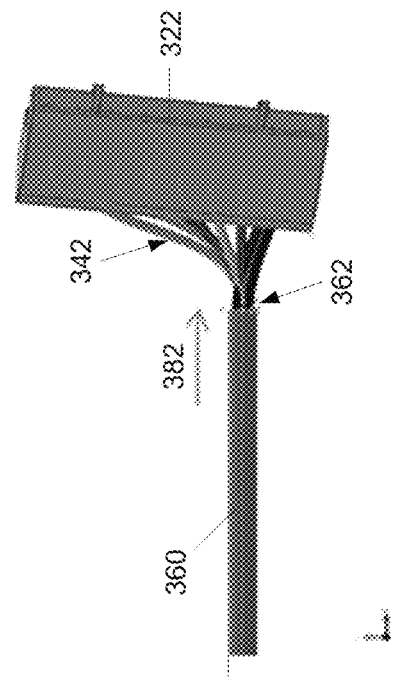
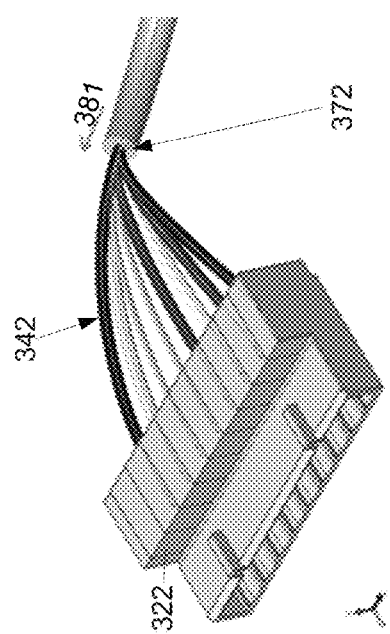
FIG. 3C
FIG. 3E
FIG. 3D (Multipin connector/component)

METHOD FOR MAINTAINING 3D ORIENTATION OF ROUTE SEGMENTS AND COMPONENTS IN ROUTE HARNESS FLATTENING

FIELD OF THE INVENTION

The present invention relates to a computer aided drafting application, and more particularly, is related to representation of 3D models for manufacturing.

BACKGROUND OF THE INVENTION

Computer aided drafting (CAD) software, such as SOLIDWORKS, may employ routing in an application that may be used to design an electrical harness. These harnesses are initially designed in 3D environment and are converted into 2D for presentation to a user, for example, as a paper printout. The 2D rendering of the 3D model of the electrical harness is called a flattened harness or a form-board design. Flattened or form-board designs are used for adding details such as connector tables, circuit summary, annotations, etc. For example, a flattened harness design may be used by manufacturers on a shop floor to manufacture the electrical harness.

All wires are flattened in existing solutions, including wires associated with connectors. However, in some cases the user instead wishes to showcase details of wiring route segments such as bends or route directions to more clearly convey the part when the harness is manufactured. For example, the flattened drawings may not accurately indicate details such as wire orientation in the context of tight space constraints for the final assembly. Further, the flattened drawings may not convey how relatively inflexible bundled wires should bend in the final assembly. In some instances, a flattened drawing may show wires detached from their connectors. Therefore, there is a need in the industry to address the abovementioned shortcomings.

SUMMARY OF THE INVENTION

Embodiments of the present invention provide a method for maintaining 3D orientation of route segments and components in route harness flattening. Briefly described, the present invention is directed to create a flattened 2D representation of a 3D modeled CAD object while maintaining a user selected wiring component represented in 3D. A user selected 3D component has a connector and a route segment with at least one stored sketch segment. A 3D and 2D tangent are calculated at a junction point of the route segment. A translation and rotation transformation is calculated to align the 2D and 3D tangents at the junction point. A calculated transformation matrix based on the translation and rotation transformation is used to display a flattened unconnected route segment aligned with the user selected 3D component.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

FIG. 3C shows the route segments of the wiring harness of FIG. 3A in 3D.

FIG. 3D is a detail of the multi-pin connector of FIG. 3A in 3D.

FIG. 3E is a detail of the multi-pin connector of FIG. 3A in 2D.

DETAILED DESCRIPTION

The following definitions are useful for interpreting terms applied to features of the embodiments disclosed herein, and are meant only to define elements within the disclosure.

This disclosure is directed to manipulation of a computer modeled object. Herein, references to manipulating an object generally will refer to manipulating, via a user interface, an image of the modeled object on a display screen. Examples of such manipulation of the modeled object include selecting, rotating, scaling, etc. It is understood that manipulations of the displayed modeled object results in manipulation by computer software of data objects representing aspects and topological features of the modeled object.

As used within this disclosure, in general, the phrase "computer-aided design" (CAD) refers to the use of computers (or workstations) to aid in the creation, modification, analysis, or optimization of a design. A "design" refers to a plan or specification (e.g., drawing), typically stored in computer-based memory, for an object or system, including construction details for that object or system. The Solid-Works® computer program, available from Dassault Systémes SolidWorks Corporation, the applicant of the current application, is one example of a computer-aided design software program. As used herein, the phrase "computer-aided design" should be construed broadly to include any computer software, device, or system that incorporates or can incorporate electrical harness design flattening capabilities.

As used within this disclosure, "XY-plane" refers to a reference plane parallel to a two dimensional representation of a model.

As used within this disclosure, a "component list" refers to a listing of individual parts of a two dimensional (2D) or three dimensional (3D) modeled assembly. In a CAD environment, a component list may be presented visually as a side-bar to a graphical window presenting a 2D or 3D rendering of the modeled assembly. The component list and the graphical window may be interactive, for example, selecting a component in the component list may highlight the corresponding component in the graphical window, and likewise selecting a component in the graphical window (for example, via a mouse click) may highlight the corresponding component in the component list.

As used within this disclosure, an "electrical harness" or "harness" (also known as a cable harness, a wire harness, wiring harness, cable assembly, wiring assembly or wiring loom) is an assembly of electrical cables or wires which transmit signals or electrical power. Typically, the cables are bound together by a durable material such as rubber, vinyl, electrical tape, conduit, a weave of extruded string, or a combination thereof. The electrical harness may include one or more terminating connectors to provide electrical connections to system components.

Figure 1A:
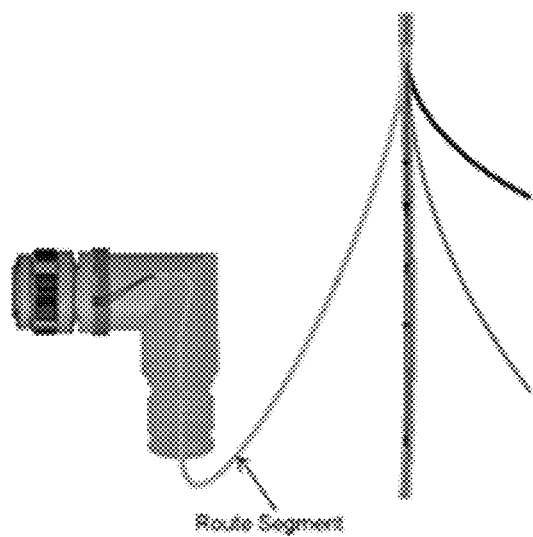
FIG. 1A is a schematic diagram of an exemplary whole route segment.
Figure 1B:
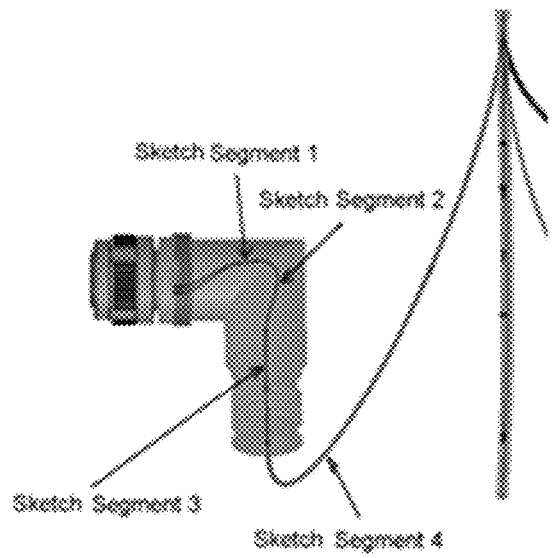
FIG. 1B is a schematic diagram showing the sketch segments present inside the route segment of FIG. 1A.

As used within this disclosure, a "route segment" is a portion of an electrical harness design in a computer-aided design environment. Typically, a route segment includes one or more sketch segments that extend between two junction points, between two connectors, or between a junction point and a connector. Also typically, a route segment has one or more route properties, stored in computer-based memory, which define one or more characteristics of the route segment, such as diameter, color, wires passing through it, etc. FIG. 1A shows whole route segment whereas FIG. 1B shows the sketch segments present inside that route segment.

As used within the disclosure, a connected route is a route segment directly connected to a selected component. Conversely, an "unconnected route" is a route segment not directly connected to a selected component, but an unconnected route may be directly connected to a connected route.

Figure 1C:
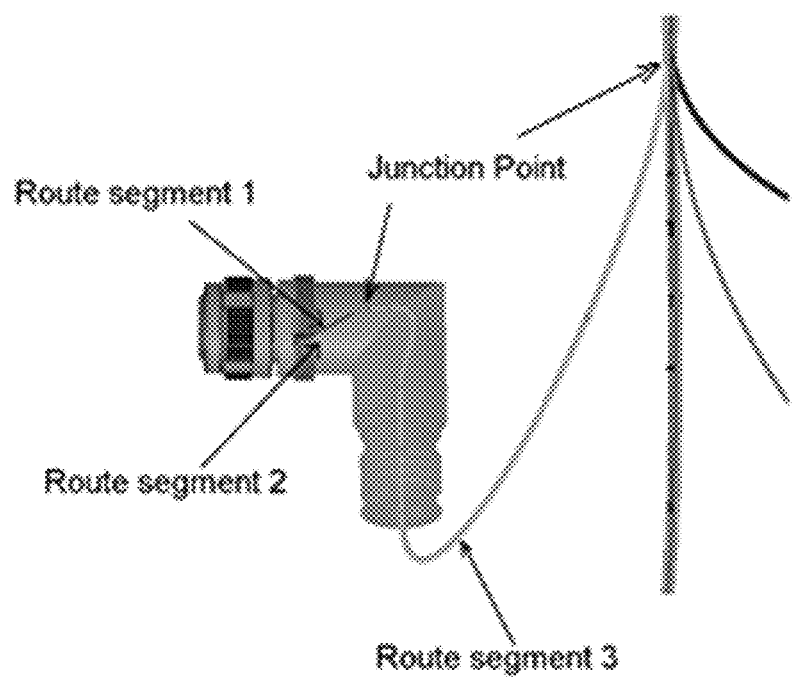
FIG. 1C is a schematic diagram showing exemplary route segments and route segment junction points.

As used within this disclosure, a "junction point" is a point on an electrical harness design in a computer-aided design environment where more than one route segments merge, as shown by FIG. 1C.

As used within this disclosure, a "connection point" or "CPoint" is a point on an electrical harness design in a computer-aided design environment where a route segment begins or ends. Typically, every connection point has a direction, referred to as a "cpoint direction," stored in computer-based memory, which identifies a direction in which the associated route segment extends. Typically, connection points or cpoint directions also have routing properties, such as diameter of the route segment and route type (e.g., electrical, piping, tubing) also stored in computer-based memory.

Figure 2A:
FIG. 2A is a schematic diagram of an exemplary 3D wiring harness.
Figure 2B:
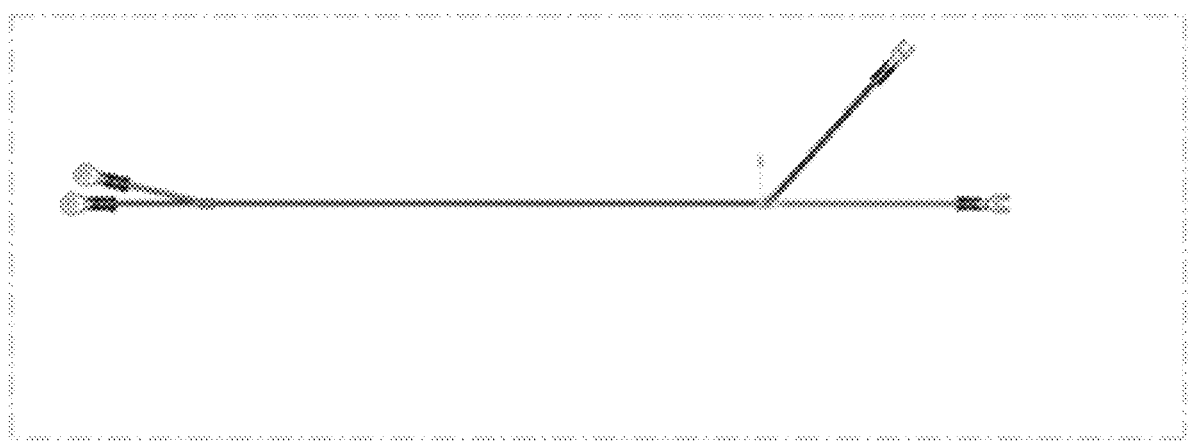
FIG. 2B is a schematic diagram of a flattened whole harness on an XY plane of the exemplary 3D wiring harness of FIG. 2A.

As used within this disclosure, the phrase "flattening" refers to a process by which a three-dimensional (3D) representation of a design (for example, a CAD rendering of a modeled object), or portion thereof, is converted into a two-dimensional (2D) representation in a computer-aided design environment. Specifically, flattening an electrical harness may be thought of as placing the entire electrical harness on XY plane and stretching each route segment (Wire/Cable) such that their lengths and connections are maintained as per the 3D Design. Any flattened harness output may be used further to create a flattened drawing (also called a formboard drawing) which typically is a document used to convey essential information like the wires used, the wire connections, the wire paths, etc. A flattened/formboard drawing conveys information that helps in manufacturing the actual electrical harness. FIG. 2A is a schematic diagram of an exemplary 3D wiring harness, while FIG. 2B is a schematic diagram of a flattened whole harness on an XY plane.

As used within this disclosure, the phrase "branch" refers to one or more electrical cables or wires in an electrical harness that extend from an electrical harness. Typically, a branch terminates at an electrical connector or connection point on an electrical component.

As used within this disclosure, the phrase "processor" or the like refers to any one or more computer-based processing devices. A computer-based processing device is a physical component that can perform computer functionalities by executing computer-readable instructions stored in memory.

As used within this disclosure, the phrase "memory" or the like refers to any one or more computer-based memory devices. A computer-based memory device is a physical component that can store computer-readable instructions that, when executed by a processor, results in the processor performing associated computer functionalities.

Reference will now be made in detail to embodiments of the present invention, examples of which are illustrated in the accompanying drawings. Wherever possible, the same reference numbers are used in the drawings and the description to refer to the same or like parts.

Exemplary embodiments of the present invention are directed to maintaining 3D details of selected modeled components while flattening the remainder to 2D. For example, the embodiments may be directed to improvements to route flattening functionality in a CAD application that maintains the 3D Orientation of Route Segments in a Flattened Route Harness. For example, a harness may have multi-pin connectors attached to multiple wires and it may be desirable to present these wires arranged with respect to connectors during manufacturing process.

In existing applications, a flattening algorithm flattens all the wires of any electrical harness without maintaining bends of wires, such that the 2D representation presents the wires in the form of fan-outs with respect to connector. Under the embodiments, users may maintain the 3D orientation for any route segment for a selected connector within the flattened harness.

The technical aspects of the embodiments are broken down into several distinct parts. The embodiments provide for detection/selection of route segments that are merely a partial portion of wire by using the application GUI. The user may select a desired component using a "Maintain 3D orientation" feature via the GUI.

The entire harness in 2D plan may be flattened by creating a point cloud data, excluding the route segments connected to selected connectors. The point cloud data of these excluded route segments are stored separately with the flattened harness with data generated using the 3D orientation of route segments. The excluded Route Segments point cloud data is aligned with other point cloud data, which is already flattened in 2D plan, for example, by applying the transformations to all of the excluded point cloud data to maintain the tangency with existing route segments. Sketches are created from these point cloud data and place the connectors at end of each Flattened Route segments by applying correct transformations to maintain the associativity with the Flattened Route segments. The implementation of these embodiments is described in further detail below.

Method

Figure 6A:
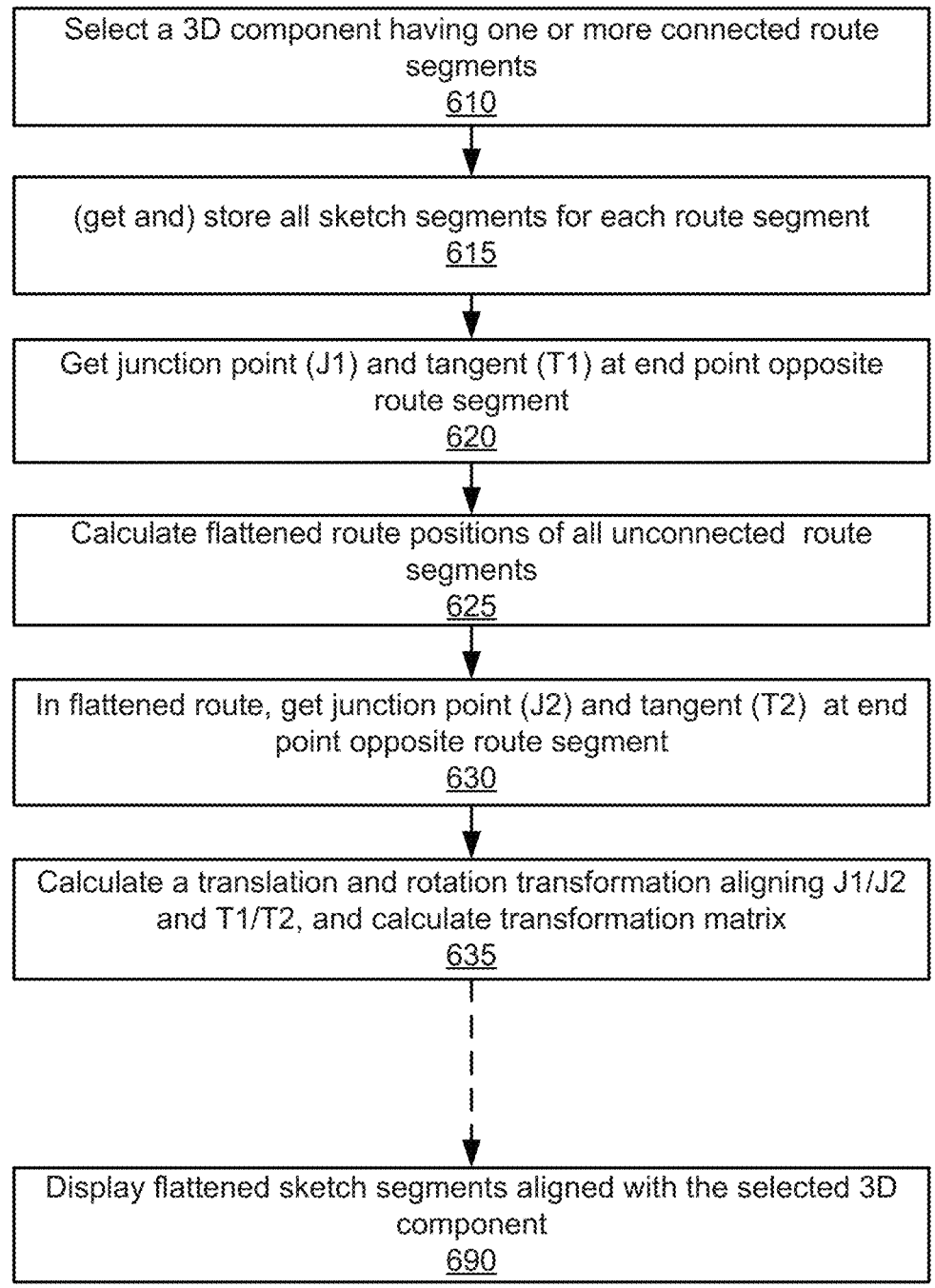
FIG. 6A is a first flow chart of a first exemplary method embodiment for an application in a computer aided drafting environment for flattening a three dimensional modeled object to a two dimensional representation while maintaining a user selected component represented in 3D.
Figure 6B:
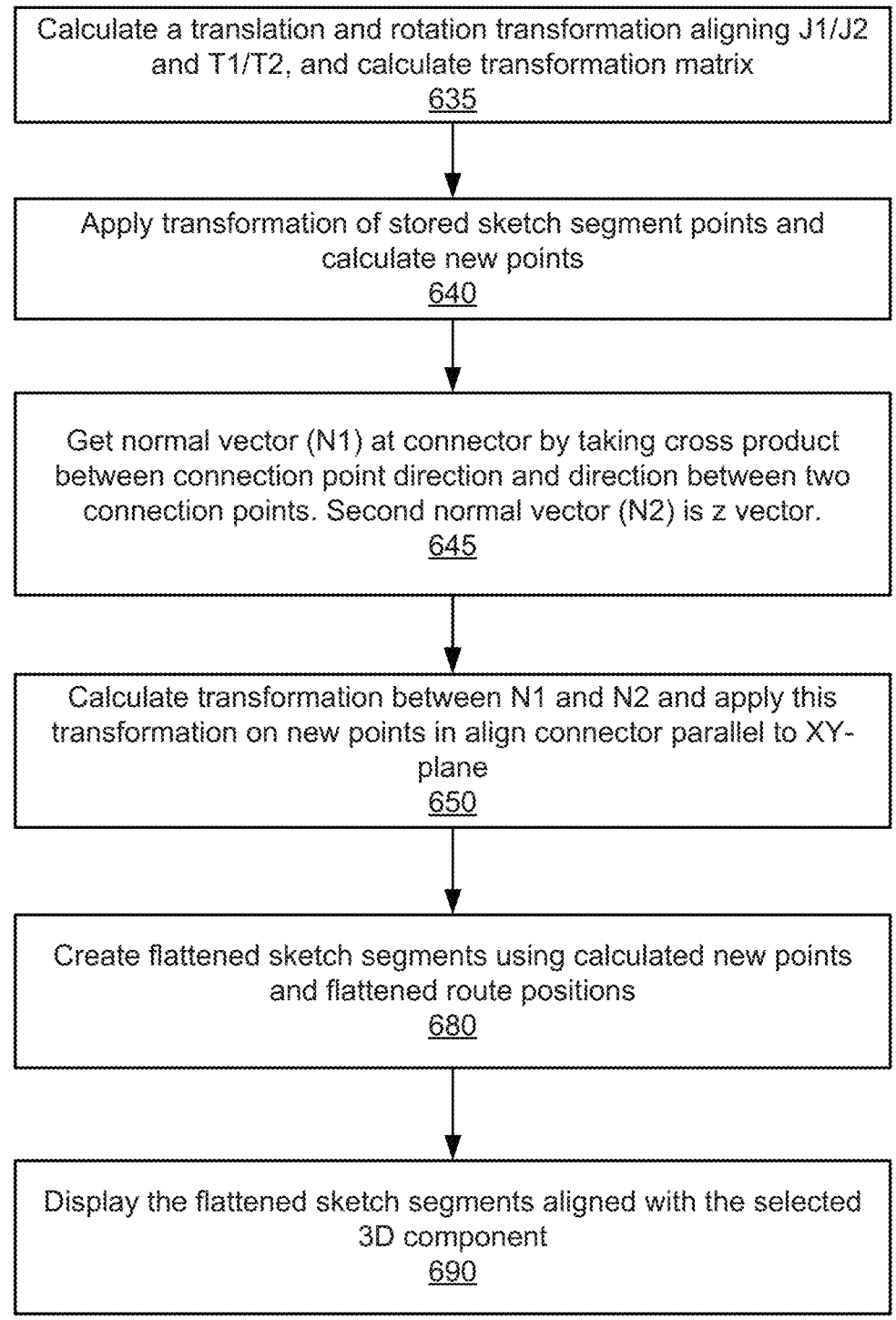
FIG. 6B is a second flow chart supplementing the method for FIG. 6A.

FIGS. 6A and 6B are flowcharts 600a, 600b for an exemplary first embodiment of a computer based method for an application in a computer aided drafting (CAD) environment for flattening a three dimensional (3D) modeled object to a two dimensional (2D) representation while maintaining a user selected component represented in 3D. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

A user selected a component of the 3D modeled object is received, for example a wiring harness, as shown by block 610. The user selected component includes a connector and a connected first route segment. The connected first route segment includes at least one sketch segment.

All sketch segments of the at least one sketch segment for the connected first route segment are stored in memory, as shown by block 615.

A first junction point (J1) at a connected first route segment end point is identified, as shown by block 620, and a first tangent (T1) at the first junction point is computed.

A flattened route position is calculated for a flattened unconnected route segment of the modeled object in direct connection with the connected first route segment at a second junction point (J2) corresponding to the first junction point in the 3D object, as shown by block 625. A second tangent (T1) is computed at the second junction point, as shown by block 630. A translation and rotation transformation is calculated aligning the first junction point to the second junction point, and aligning the first tangent and the second tangent, as shown by 635, and a transformation matrix is calculated based on the translation and rotation transformation. The flattened unconnected route segment is displayed aligned with the user selected 3D component, as shown by block 690.

FIG. 6B shows additional implementation of the method shown in FIG. 6A. A transformation is applied to the stored sketch segment points to calculate transformed sketch segment points, as shown by block 640. A first normal vector (N1) is calculated at the connector by taking a cross product between a connection point direction and a second direction between two connection points, as shown by block 645, where the second normal vector (N2) is parallel to the Z axis. As shown by block 650, an N1/N2 transformation is calculated between the first normal vector N1 and the second normal vector N2. The N1/N2 transformation is applied on the transformed sketch segment points aligning the connector parallel to an XY-plane.

Figure 3A:
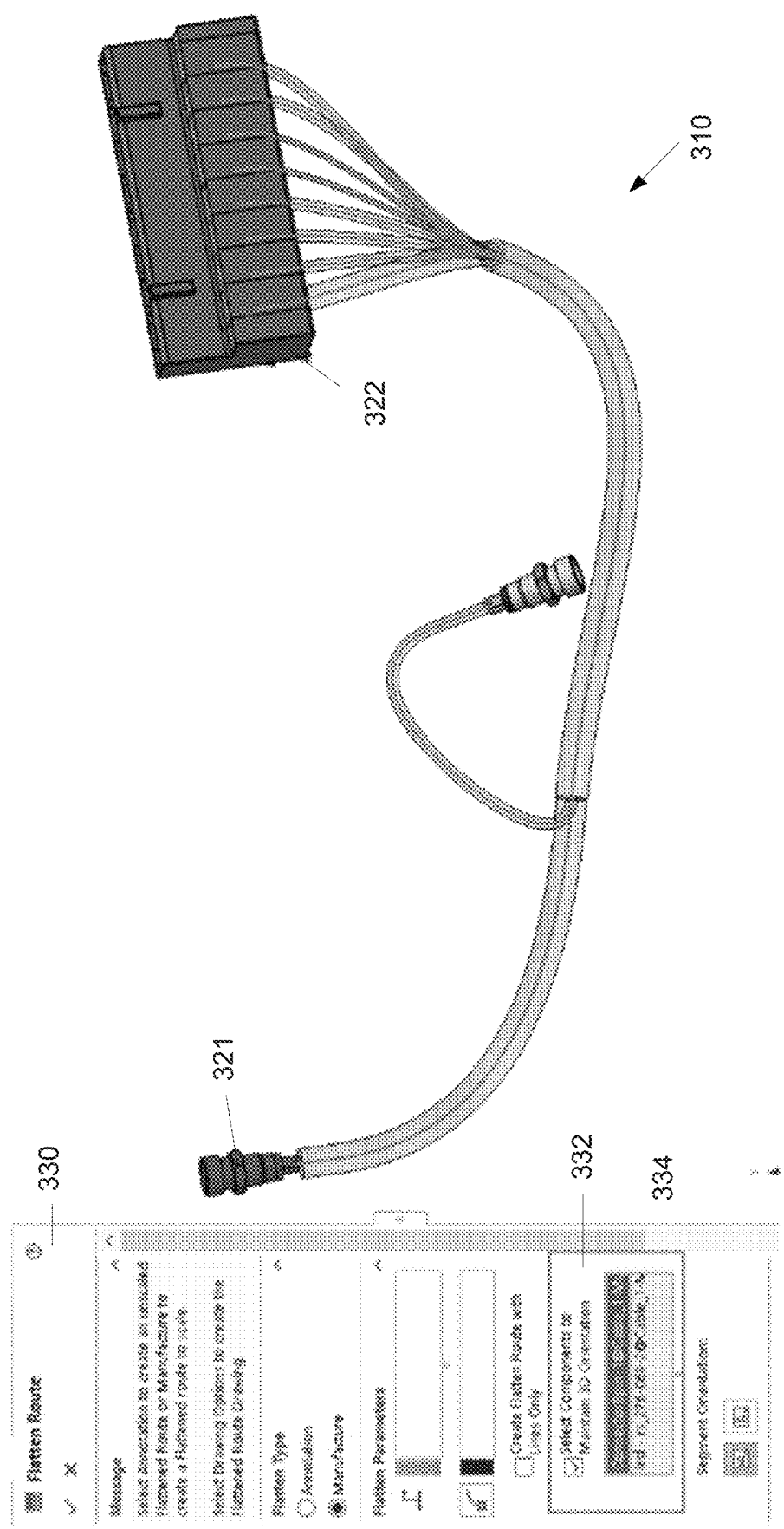
FIG. 3A is a drawing of a CAD represented 3D model of a wiring harness as a workpiece for a first exemplary embodiment of a flattening method while maintaining 3D connectors.
Figure 3B:
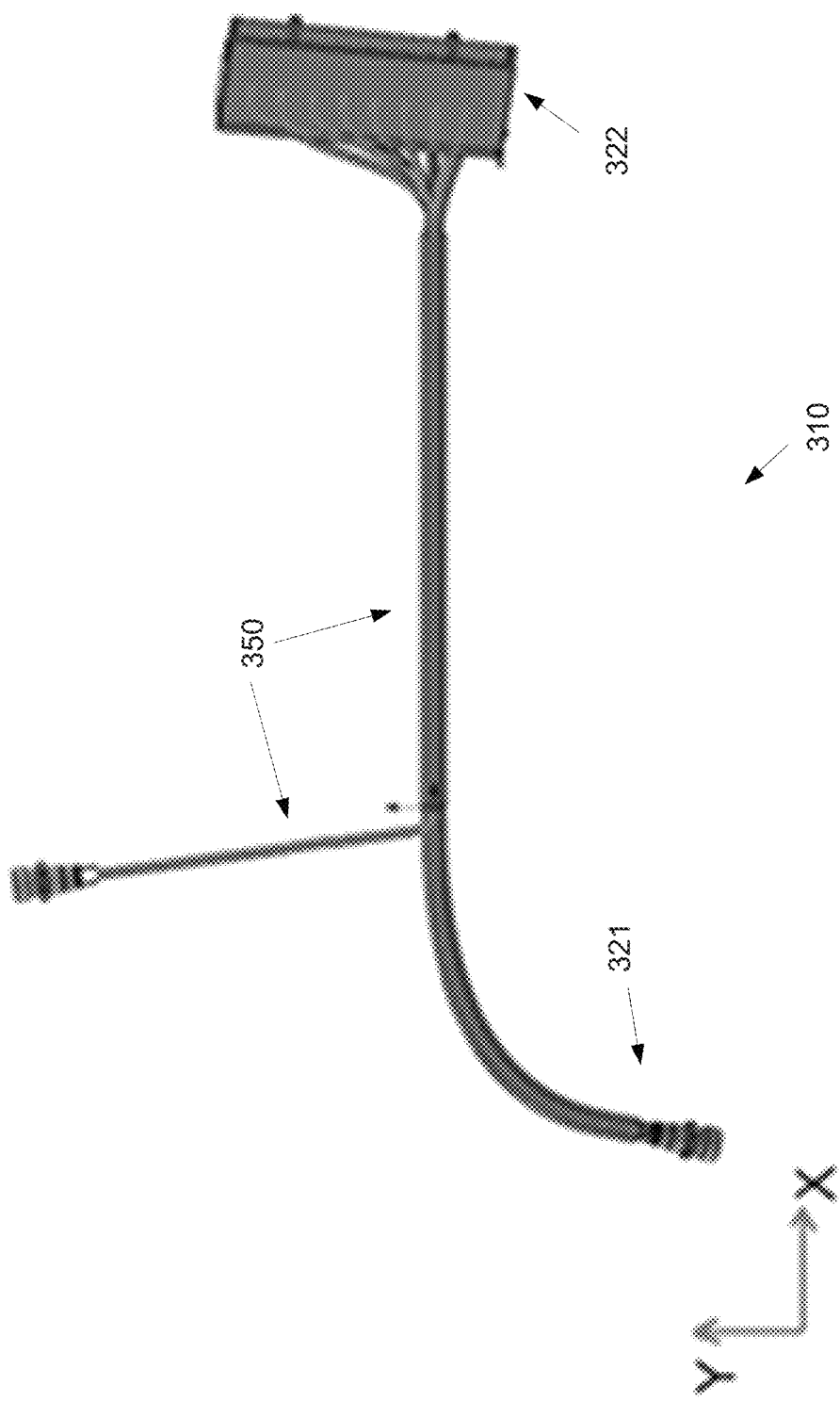
FIG. 3B is a drawing of the wiring harness of FIG. 3A after applying the first exemplary embodiment of a flattening method while maintaining 3D connectors.

As shown in FIG. 3A, the CAD environment GUI provides a "Select components to Maintain 3D Orientation" option 332 in a flatten a route interface property page 330 for the user to identify route segments associated with selected components 321, 322 of a wiring harness 310. The user may select one or more components 321, 322 the user wishes to represent as per the 3D design in a flattened image. A hybrid 2D-3D flattening application in the CAD environment receives the selected route having routes segments. In the example shown in FIG. 3A, checking the "Select components to Maintain 3D Orientation" 332 in the flatten route property page 330 Option enables a component selection box 334 indicating the selected components 321, 322 whose connected route segments are not to be flattened. Here, one single pin connector 321 and one multi-pin connector 322 are selected. The embodiments automatically identify route segments connected to these connectors (as per the existing flattening process), so the connected route segments 321, 322 keep their orientation according to the 3D design after flattening, as shown in FIG. 3B, whereas the rest of the route segments 350 are flattened in a 2D Plane.

When the user has identified the selected components 321, 322, the first embodiment determines if each is a single pin connector 321 or a multi-pin connector 322. For example, the internal data (descriptor) of each selected component may have a data field indicating whether the selected component is a single pin connector 321 or multi-pin connector 322, or the first embodiment may look to see if more than one pin is identified in the descriptor for the selected connector 321, 322.

As shown in FIG. 3C, each route segment associated between a connector 321, 322 and junction points 371, 372 and/or another connector 321, 322 is deemed a connected route segment 341. These route segments are internally identified and stored in an array, for example, called "routeNotToFlatten."

For each junction point 371, 372 connecting 3D route segment, a junction point, and tangent is computed for the 3D model. FIG. 3D shows a portion of the 3D representation of the harness 310 (FIG. 3C) with the multi-pin connector 322. In order to align the route segments 342 and the flattened route segment 360 (FIG. 3E), a first junction point 372 is identified in the 3D model and an associated first (3D) tangent 381 is determined. The first tangent 381 is calculated at the junction point 372 for the 3D route segment 342, and data for the first tangent 381 and the first junction point 372 is stored as Tangent1 and Junction1 data respectively. Table 1 shows sample coordinates for a 3D junction point and tangent.

TABLE 1 examples of 3D junction and tangent data

| | Example | X-Coordinate | Y-Coordinate | Z-Coordinate |
|---|---|---|---|---|
| Junction1 | Junction 372 (Point X, Y, Z) | −0.062541 | −0.060943 | 0.082751 |
| Tangent1 | Tangent 381 (Direction Vector X, Y, Z) | −0.677669 | −0.728547 | 0.099913 |

Likewise, as shown in FIG. 3E, the corresponding second (2D) junction point 362 ("junction2") and second (2D)

tangent 382 ("tangent2") are determined for the flattened model once flattening of route segments is completed in a FlattenedPointTo3DPoint map. Data for the second junction point 362 are stored as Junction2 data, and the second tangent 382 data are stored as Tangent2 data. Table 2 shows sample coordinates for a flattened junction Point and tangent.

TABLE 2 examples of flattened junction and tangent data

| Example | | X-Coordinate | Y-Coordinate | Z-Coordinate |
| --- | --- | --- | --- | --- |
| Junction2 | Junction 362 (Point X, Y, Z) | 0.00 | 0.00 | 0.00 |
| Tangent2 | Tangent 382 (Direction Vector X, Y, Z) | −1.0 | 0.00 | 0.00 |

Regarding the transformation matrix in the flowchart shown in FIG. 6B, under the first embodiment the transformation calculation may be implemented in three steps. First two steps are to align the 3D tangent 381 (FIG. 3D) to the Y-axis and last step is to align the Y-axis to the 2D tangent 382 (FIG. 3E). The 2D tangent 382 direction and the 3D tangent direction 381 are normalized. Instead of performing a Y-axis transformation, calculation may be done by aligning the X-axis, where here the transformation calculates about the Y-axis instead of the X-axis.

For the rotation transform about Z-axis for the 3D tangent 381 (zAxisRotationMatrix), the 3D tangent 381 ("Tangent1") point is projected on the XY-plane, which amounts to setting the Z value as zero. The normalization is performed again for the new direction, namely the 3D Tangent 381 on the XY-plane ("Tangent1onXYplane"). If the normalized 3D tangent 381 results in zero X and Y values are zero, an identity matrix is created around Z-axis at the second (2D) junction point 362 (i.e., zAxisRotationMatrix), or alternatively, a rotation matrix is calculated between the Y-axis and Tangent1 on the XYplane around the Z-axis i.e., zAxisRotationMatrix.

Figure 4A:
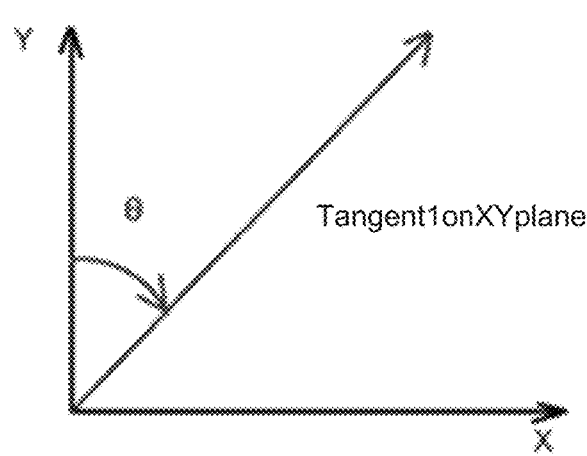
FIG. 4A is a plot showing a first angle of a 3D junction point tangent in the XY plane.
Figure 4B:
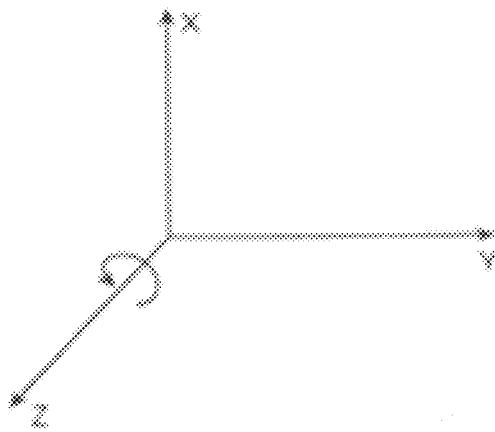
FIG. 4B is a plot indicating rotation around the Z-axis with respect to the XY plane.

Calculating zAxisRotationMatrix involves calculating an angle (Theta: θ) between Y-axis and Tangent1onXYplane, as shown by FIG. 4A. To align Tangent1onXYplane to the Y-axis, a rotation matrix about the Z-axis is calculated, as shown by FIG. 4B.

With the use of theta angle is used to calculate rotation matrix, here named zAxisRotationMatrix.

$$\begin{bmatrix} x' \\ y' \\ z' \\ w \end{bmatrix} = \begin{bmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{bmatrix} \begin{bmatrix} x \\ y \\ z \\ w \end{bmatrix} \quad \text{(Eq. 1)}$$

Rotation Transform about X-axis for Tangent1: "xAxisRotationMatrix"

Tangent1 point is translated onto the YZ plane, by setting the X coordinate value as zero. Normalization is performed for these new directions (Tangent1onYZplane). If Tangent1onYZplane's Y and Z values are zero, then an Identity matrix is created around X-axis at junction2 (i.e., xAxisRotationMatrix) else need to calculate rotation matrix between Y-axis and Tangent1onYZplane around X-axis i.e., xAxisRotationMatrix.

Figure 4C:
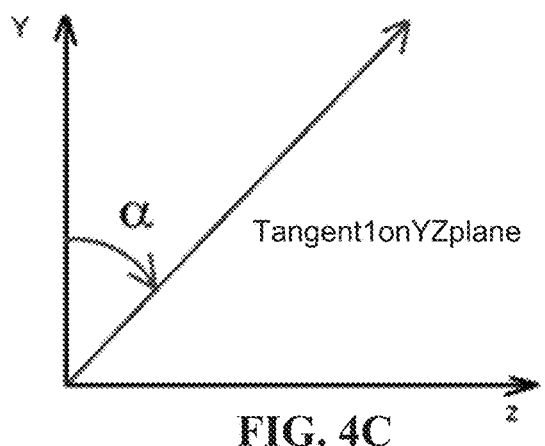
FIG. 4C is a plot showing a second angle of the 3D junction point tangent in the YZ plane.
Figure 4D:
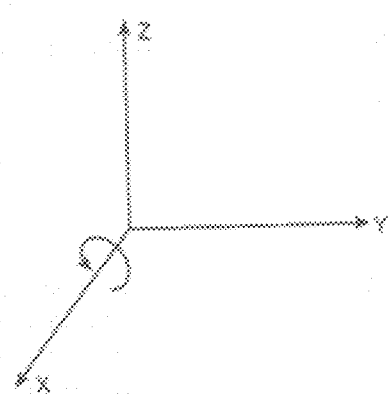
FIG. 4D is a plot indicating rotation around the X-axis with respect to the YZ plane.

Calculating xAxisRotationMatrix includes calculating an angle (Alpha: α) between Y-axis and Tangent1onYZplane, as shown in FIG. 4C. A rotation matrix is calculated about the X-axis to align Tangent1onYZplane to the Y-axis, as shown by FIG. 4D. The alpha angle is used to calculate a rotation matrix xAxisRotationMatrix $$\begin{bmatrix} x' \\ y' \\ z' \\ w \end{bmatrix} = \begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix} \begin{bmatrix} x \\ y \\ z \\ w \end{bmatrix} \quad \text{(Eq. 2)}$$

Rotation Transform about Z-axis for Tangent2: "zAxis2DRotationMatrix"

Project Tangent2 points are projected on the XY plane (i.e., setting Z value as zero). Here again normalization is performed for the new direction (Tangent2onXYplane).

If the X and Y values of Tangent2onXYplane are zero, an Identity matrix is created around the Z-axis at junction2 (i.e., zAxis2DRotationMatrix). Otherwise, a rotation matrix is calculated between the Y-axis and Tangent2onXYplane around Z-axis i.e., zAxis2DRotationMatrix.

Figure 4E:
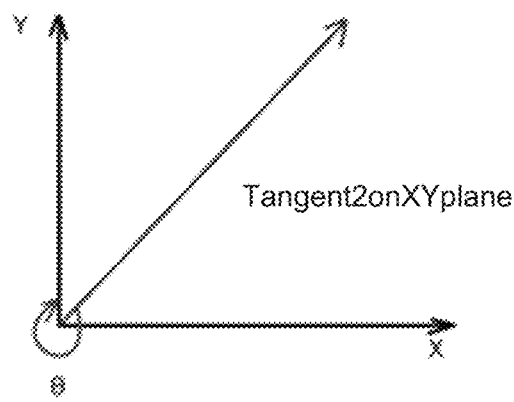
FIG. 4E is a plot showing a first angle of a 2D junction point tangent in the XY plane.

An angle (Theta: θ) is calculated between the Y-axis and Tangent2onXYplane for zAxis2DrotationMatrix, shown by FIG. 4E. The rotation matrix is calculated about the Z-axis to align Tangent2onXYplane to Y-axis, as shown by FIG. 4B. The angle theta is used calculate a rotation matrix zAxisRotation2DMatrix.

$$\begin{bmatrix} x' \\ y' \\ z' \\ w \end{bmatrix} = \begin{bmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{bmatrix} \begin{bmatrix} x \\ y \\ z \\ w \end{bmatrix} \quad \text{(Eq. 3)}$$

The three rotation transforms derived above (zAxisRotationMatrix, xAxisRotationMatrix, zAxis2DrotationMatrix are multiplied to provide the Rotation "RotationMatrix."

A matrix for translating between Junction1 and Junction2 is derived as follows. A difference between Junction1 and Junction2 is calculated. For example, this difference point may be referred to as T having coordinates are Tx, Ty and Tz. With the use of difference, the translation matrix "TranslationMatrix" is calculated:

$$\begin{bmatrix} 1 & 0 & 0 & Tx \\ 0 & 1 & 0 & Ty \\ 0 & 0 & 1 & Tz \end{bmatrix} \quad \text{(Eq. 4)}$$

The calculations described above provide the RotationMatrix and TranslationMatrix, which may be applied to the routeNotToFlatten array. Sketch segment points for connected route segments from routeNotToFlatten are each multiplied by RotationMatrix and then multiplied with TranslationMatrix to produce transformed sketch segment points. Transformed sketch segments are created from the transformed sketch segment points. The transformed sketch segments may form 3D segments 342 as per the 3D design attached to the flattened segment 360 as shown in FIG. 3E.

Figure 5:
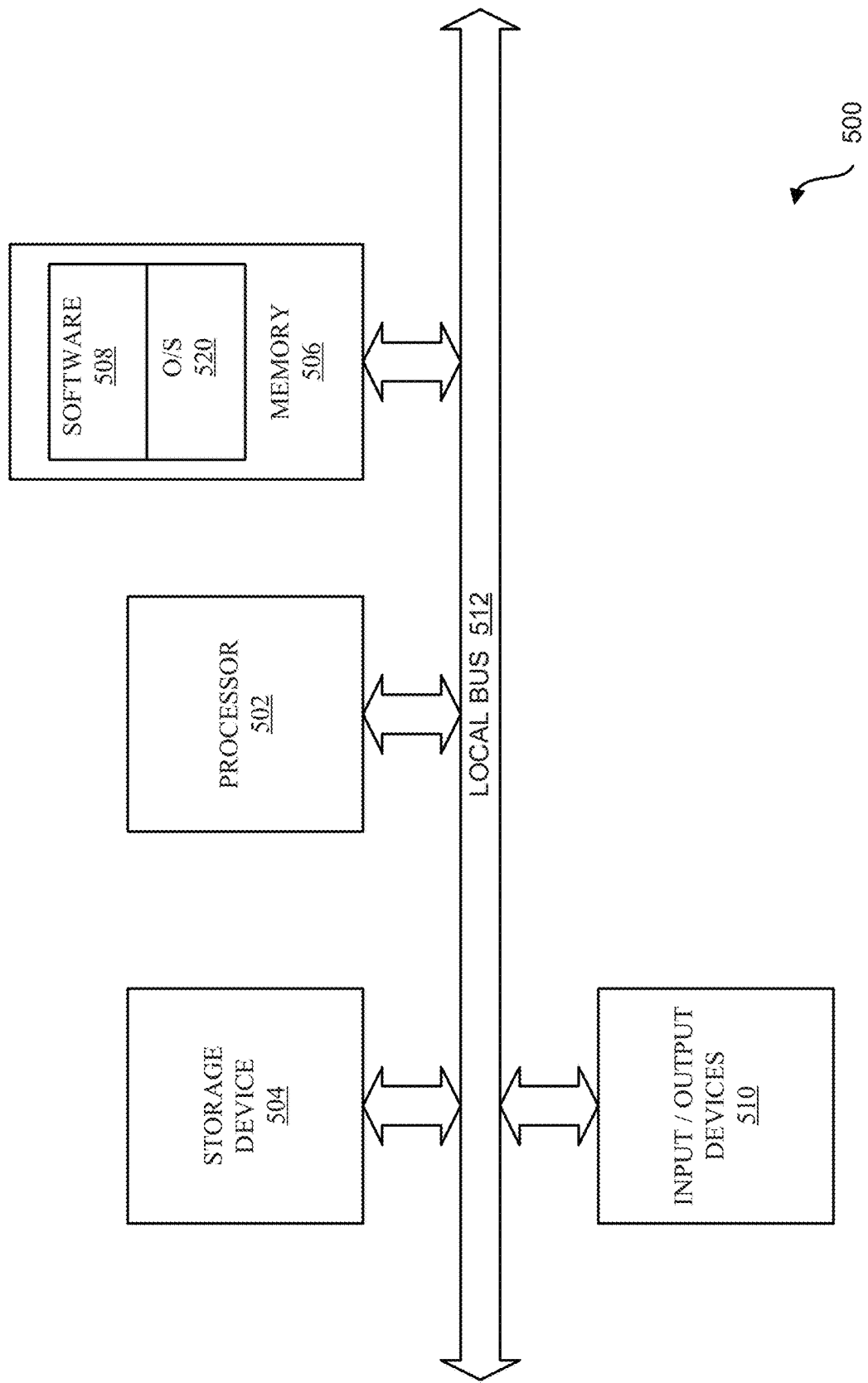
FIG. 5 is a schematic diagram illustrating an example of a system for executing functionality of the present invention.

The present system for executing the functionality described in detail above may be a computer, an example of which is shown in the schematic diagram of FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As per the embodiments described above, designers can easily create flattened harness drawings to showcase the orientation and bend information of wire bundles as well as the correct orientations of the connectors with respect to the wires/bundles. Advantageously, connector orientation is correct with respect to associated wire pins. In existing solutions, the connector orientation is merely approximate for multi-pin connectors, whereas the embodiments provide accurate connector orientations. Hence the embodiments provide a more robust solution over the existing one, enabling manufactures to manufacture accurate electrical harnesses which may be more easily be assembled in the main assembly design.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer based method for an application in a computer aided drafting (CAD) environment for flattening a three dimensional (3D) modeled object to a two dimensional (2D) representation while maintaining a user selected wiring component represented in 3D, comprising the steps of:
- receiving the user selected component of the 3D modeled object comprising a connector and a connected first route segment, wherein the connected first route segment comprises at least one sketch segment;
- storing all sketch segments of the at least one sketch segment;
- identifying a first junction point at a connected first route segment end point;
- computing a first tangent at the first junction point;
- calculating a flattened route position for a flattened unconnected route segment of the modeled object in direct connection with the connected first route segment at a second junction point corresponding to the first junction point in the 3D object;
- computing a second tangent at the second junction point;
- calculating a translation and rotation transformation aligning the first junction point to the second junction point, and aligning the first tangent and the second tangent;
- calculating a transformation matrix based on the translation and rotation transformation; and
- displaying in 2D the flattened unconnected route segment aligned with the user selected 3D component displayed according to the 3D orientation of the selected 3D component.

2. The method of claim 1, further comprising the step of:
- applying a transformation to the stored sketch segment points to calculate transformed sketch segment points.

3. The method of claim 2, further comprising the step of calculating a first normal vector (N1) at the connector by taking a cross product between a connection point direction and a second direction between the first connection point and a second connection point, wherein a second normal vector (N2) is in a Z-direction normal to a connector surface plane, wherein the connector surface plane is referenced as the XY-plane.

4. The method of claim 3, further comprising the steps of:
- calculating an N1/N2 transformation between the first normal vector N1 and the second normal vector N2; and
- applying the N1/N2 transformation on the transformed sketch segment points aligning the connector parallel to the XY-plane.

5. The method of claim 4, further comprising the step of creating flattened sketch segments using calculated transformed sketch segment points and flattened route positions.

6. The method of claim 1, wherein the user selected component comprises a wiring harness.

7. The method of claim 1, further comprising the step of identifying each route segment for the selected connector.

* * * * *